(12) United States Patent
Oshima et al.

(10) Patent No.: US 8,268,928 B2
(45) Date of Patent: Sep. 18, 2012

(54) THERMOPLASTIC POLYMER COMPOSITION AND SHEET-LIKE MOLDED ARTICLE THEREFROM

(75) Inventors: Hiroshi Oshima, Tsukuba (JP); Toyoaki Kurihara, Tsukuba (JP)

(73) Assignee: Kuraray CC., Ltd., Kurashiki-shi (JP)

( * ) Notice: Subject to any disclaimer, the term of this patent is extended or adjusted under 35 U.S.C. 154(b) by 0 days.

(21) Appl. No.: 13/128,548

(22) PCT Filed: Nov. 5, 2009

(86) PCT No.: PCT/JP2009/068872
§ 371 (c)(1),
(2), (4) Date: May 10, 2011

(87) PCT Pub. No.: WO2010/055798
PCT Pub. Date: May 20, 2010

(65) Prior Publication Data
US 2011/0218303 A1    Sep. 8, 2011

(30) Foreign Application Priority Data

Nov. 11, 2008 (JP) ................................. 2008-289163
Jul. 21, 2009 (JP) ................................. 2009-170566

(51) Int. Cl.
C08F 297/02 (2006.01)
C08J 5/18 (2006.01)
C08L 33/10 (2006.01)
C08L 53/00 (2006.01)

(52) U.S. Cl. ........................................................ 525/89
(58) Field of Classification Search ...................... 525/89
See application file for complete search history.

(56) References Cited

U.S. PATENT DOCUMENTS

| 5,668,231 | A | 9/1997 | Varshney et al. |
| 6,878,789 | B2 | 4/2005 | Uchiumi et al. |
| 7,282,535 | B2 | 10/2007 | Kakeda et al. |
| 2003/0191243 | A1 | 10/2003 | Hamada et al. |
| 2005/0085592 | A1 | 4/2005 | Taniguchi et al. |
| 2005/0272865 | A1 | 12/2005 | Taniguchi et al. |
| 2006/0183858 | A1 | 8/2006 | Takesada et al. |

FOREIGN PATENT DOCUMENTS

| JP | 6-93060 | 4/1994 |
| JP | 7-25859 | 3/1995 |
| JP | 10-168271 | 6/1998 |
| JP | 11-335432 | 12/1999 |
| JP | 11-349782 | 12/1999 |
| JP | 2000-154329 | 6/2000 |
| JP | 2002 60584 | 2/2002 |
| JP | 2002-338707 | 11/2002 |
| JP | 2003-128809 | 5/2003 |
| JP | 2003 277574 | 10/2003 |
| JP | 2004 300164 | 10/2004 |
| JP | 2006 124724 | 5/2006 |
| WO | WO 02/092696 A1 | 11/2002 |
| WO | WO 2009/054553 A2 | 4/2009 |
| WO | WO 2009/054553 A3 | 4/2009 |

OTHER PUBLICATIONS

Georges Moineau, et al., "Synthesis of fully acrylic thermoplastic elastomers by atom transfer radical polymerization (ATRP), $2^a$ Effect of the catalyst on the molecular control and the rheological properties of the triblock copolymers", Macromolecular Chemistry and Physics, vol. 201. 2000, pp. 1108-1114.

International Search Report issued Feb. 9, 2010 in PCT/JP09/68872 filed Nov. 5, 2009.

*Primary Examiner* — Jeffrey Mullis
(74) *Attorney, Agent, or Firm* — Oblon, Spivak, McClelland, Maier & Neustadt, L.L.P.

(57) ABSTRACT

[Object] Provided are a sheet-like molded article having excellent surface smoothness, moldability, flexibility, and a high transmittance of short-wavelength light, and a thermoplastic polymer composition used to produce the sheet-like molded article.

[Solution] A thermoplastic polymer composition containing an acrylic block copolymer (A) and an acrylic resin (B), in which the acrylic block copolymer (A) has, in its molecule, at least one structure where polymer blocks (a2) mainly composed of a methacrylic ester unit are bonded to both ends of a polymer block (a1) mainly composed of an acrylic ester unit, the acrylic block copolymer (A) having a specific weight-average molecular weight range, the acrylic block copolymer (A) contains an acrylic block copolymer (A1) having a polymer block (a2) content of 40% by mass or more and not less than 80% by mass and contains an acrylic block copolymer (A2) having a polymer block (a2) content of 10% by mass or more and less than 40% by mass, the acrylic resin (B) is mainly composed of a methacrylic ester unit, and the mass ratio [(A)/(B)] is in the range of 97/3 to 10/90.

16 Claims, No Drawings

THERMOPLASTIC POLYMER COMPOSITION AND SHEET-LIKE MOLDED ARTICLE THEREFROM

TECHNICAL FIELD

The present invention relates to a thermoplastic polymer composition and a sheet-like molded article from the thermoplastic polymer composition. The present invention provides a sheet-like molded article having excellent flexibility, transparency, surface smoothness, and moldability and a high transmittance of short-wavelength light.

BACKGROUND ART

It has been known that acrylic block copolymers each having a structure in which a methacrylic ester polymer block is bonded to each end of an acrylic ester polymer block have excellent flexibility, transparency, and weatherability and are useful in various fields. Acrylic block copolymers are molded into, for example, sheet-like articles used for films and sheets in the field of optics and for outdoor building materials. However, acrylic block copolymers do not have sufficient mechanical properties alone compared with styrene block copolymers. This limits fields of utilization thereof.

For example, polymer compositions each containing an acrylic block copolymer and an acrylic resin mainly composed of a methacrylic ester unit are reported (see PTLs 1 and 2). These polymer compositions have excellent mechanical properties compared with acrylic block copolymers alone. However, in the case where a sheet-like molded article is produced by extrusion, the tackiness of the resulting sheet-like molded article causes poor moldability, i.e., excessively strong adhesion to a chill roll, thereby reducing productivity. Alternatively, a higher viscosity of the composition causes fine grain-like irregularities on a surface of the sheet-like molded article produced by extrusion. The resulting sheet-like molded article is not satisfactory and has a room for improvement.

Furthermore, in order to improve the impact resistance of an acrylic resin mainly containing a methacrylic ester unit, resin compositions in which acrylic block copolymers are mixed with acrylic resins are reported (see PTLs 3 and 4). However, specific resin compositions disclosed in these literatures have poor flexibility. For thin walled molded articles, such as a sheet-like molded article, the application of stress is likely to cause cracking to lead to fracture. This limits fields of utilization thereof.

PTLs 5 and 6 each disclose a laminate film for another material, the laminate film being characterized by weatherability, flexibility, transparency, and so forth and serving as a sheet-like molded article composed of a composition mainly containing an acrylic block copolymer. However, these literatures do not specifically describe a method for improving various physical properties by the addition of an acrylic resin.

PTL 7 discloses a covering sheet composed of a composition containing an acrylic block copolymer and an acrylic resin. PTL 8 discloses an optical member composed of a composition containing an acrylic block copolymer. However, in the case where an acrylic block copolymer alone or a composition containing one type of acrylic block copolymer and an acrylic resin is molded by extrusion into a sheet-like molded article, fine streak-like irregularities are formed on a surface of the sheet-like molded article. So, the resulting sheet-like molded article is not satisfactory and has a room for improvement.

CITATION LIST

Patent Literature

PTL 1: Japanese Unexamined Patent Application Publication No. 10-168271
PTL 2: Japanese Unexamined Patent Application Publication No. 2003-277574
PTL 3: Japanese Unexamined Patent Application Publication No. 2000-154329
PTL 4: International Publication No. 02/092696
PTL 5: Japanese Unexamined Patent Application Publication No. 2002-338707
PTL 6: Japanese Unexamined Patent Application Publication No. 2003-128809
PTL 7: Japanese Unexamined Patent Application Publication No. 11-349782
PTL 8: International Publication No. 09/054553
PTL 9: Japanese Examined Patent Application Publication No. 7-25859
PTL 10: Japanese Unexamined Patent Application Publication No. 11-335432
PTL 11: Japanese Unexamined Patent Application Publication No. 6-93060

Non Patent Literature

NPL 1: Macromol. Chem. Phys. vol. 201, pp. 1108-1114 (2000)

SUMMARY OF INVENTION

Technical Problem

It is an object of the present invention to provide a sheet-like molded article having excellent flexibility, transparency, surface smoothness, moldability, and a high transmittance of short-wavelength light, and to provide a thermoplastic polymer composition used to produce the sheet-like molded article.

Solution to Problem

The inventors have conducted intensive studies in order to solve the foregoing problems and have found that the problems are solved by mixing an acrylic resin with a specific acrylic block copolymer in a specific proportion. This finding has led to the completion of the present invention.

That is, according to the present invention, the foregoing object is achieved by providing a thermoplastic polymer composition containing an acrylic block copolymer (A) and an acrylic resin (B), in which the acrylic block copolymer (A) has, in its molecule, at least one structure where polymer blocks (a2) mainly composed of a methacrylic ester unit are bonded to both ends of a polymer block (a1) mainly composed of an acrylic ester unit, the acrylic block copolymer (A) having a weight-average molecular weight of 10,000 to 100,000, the acrylic block copolymer (A) contains an acrylic block copolymer (A1) having a polymer block (a2) content of 40% by mass or more and 80% by mass or less and contains an acrylic block copolymer (A2) having a polymer block (a2) content of 10% by mass or more and less than 40% by mass, the acrylic resin (B) is mainly composed of a methacrylic ester unit, and the mass ratio of the acrylic block copolymer (A) to the acrylic resin (B), i.e., [(A)/(B)], is in the range of 97/3 to 10/90, and by providing a sheet-like molded article composed of the thermoplastic polymer composition.

In each of the thermoplastic polymer composition and the sheet-like molded article according to a preferred embodiment of the present invention, the acrylic resin (B) has a melt flow rate of 15 g/10 min or more at 230° C. and 37.3 N.

In each of the thermoplastic polymer composition and the sheet-like molded article according to another preferred embodiment of the present invention, the acrylic resin (B) has a melt flow rate of less than 15 g/10 min at 230° C. and 37.3 N.

Preferably, in the present invention, the proportion of the acrylic block copolymer (A1) is 5% by mass or more with respect to the total amount of the acrylic block copolymer (A), and the acrylic block copolymer (A) has an average polymer block (a2) content of 35% by mass or more and 80% by mass or less.

Preferably, the sheet-like molded article of the present invention has an average transmittance of light with a wavelength of 400 nm to 500 nm of 40% or more, provided that the average transmittance is measured by a spectral transmittance measurement method with a D65 light source at a viewing angle of 2 degrees, a measurement temperature of 25° C., and an optical path length of 15 mm.

Advantageous Effects of Invention

According to the present invention, the use of the foregoing constitution results in a sheet-like molded article having excellent flexibility, transparency, surface smoothness, moldability, and a high transmittance of short-wavelength light and results in a thermoplastic polymer used to produce the sheet-like molded article.

DESCRIPTION OF EMBODIMENTS

The present invention will be described in detail below.

A thermoplastic polymer composition according to the present invention is an acrylic block copolymer containing an acrylic block copolymer (A) and an acrylic resin (B), in which the acrylic block copolymer (A) has, in its molecule, at least one structure where polymer blocks (a2) mainly composed of a methacrylic ester unit are bonded to both ends of a polymer block (a1) mainly composed of an acrylic ester unit, and the acrylic block copolymer having a weight-average molecular weight of 10,000 to 100,000, the acrylic block copolymer (A) contains an acrylic block copolymer (A1) having a polymer block (a2) content of 40% by mass or more and 80% by mass or less and contains an acrylic block copolymer (A2) having a polymer block (a2) content of 10% by mass or more and less than 40% by mass, the acrylic resin (B) is mainly composed of a methacrylic ester unit, and the mass ratio of the acrylic block copolymer (A) to the acrylic resin (B), i.e., [(A)/(B)], is in the range of 97/3 to 10/90.

The acrylic block copolymer (A), which is a first component of the present invention, has, in its molecule, at least one structure where polymer blocks (a2) mainly composed of a methacrylic ester unit are bonded to both ends of a polymer block (a1) mainly composed of an acrylic ester unit, i.e., an (a2)-(a1)-(a2) structure (in the structure, "-" represents a chemical bond).

The polymer block (a1) mainly composed of an acrylic ester unit in the acrylic block copolymer (A) is a polymer block mainly composed of an acrylic ester unit. Examples of an acrylic ester used for the formation of the polymer block (a1) include methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, and 2-methoxyethyl acrylate. Among these compounds, alkyl acrylates, such as methyl acrylate, ethyl acrylate, isopropyl acrylate, n-butyl acrylate, 2-ethylhexyl acrylate, dodecyl acrylate, phenoxyethyl acrylate, and 2-methoxyethyl acrylate, are preferred from the viewpoint of improving flexibility. n-Butyl acrylate and 2-ethylhexyl acrylate are more preferred. The polymer block (a1) may be composed of one or two or more of these acrylic esters.

As long as the object and advantageous effects of the present invention are not impaired, the polymer block (a1) may contain a monomer, such as a reactive group-containing acrylic ester unit, e.g., glycidyl acrylate or allyl acrylate, or another polymerizable monomer unit other than the acrylic ester unit, e.g., methacrylic ester, methacrylic acid, acrylic acid, an aromatic vinyl compound, acrylonitrile, methacrylonitrile, or olefin, as a comonomer. The proportion of the reactive group-containing acrylic ester unit or another polymerizable monomer unit is preferably low and preferably 20% by mass or less and more preferably 10% by mass or less from the viewpoint of providing the advantageous effects of the present invention.

The polymer block (a2) mainly composed of a methacrylic ester unit in the acrylic block copolymer (A) is a polymer block mainly composed of a methacrylic ester unit. Examples of a methacrylic ester used for the formation of the polymer block (a2) include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, and 2-methoxyethyl methacrylate. Among these compounds, alkyl methacrylates, such as methyl methacrylate, ethyl methacrylate, isopropyl methacrylate, n-butyl methacrylate, tert-butyl methacrylate, cyclohexyl methacrylate, and isobornyl methacrylate, are preferred from the viewpoint of improving transparency and heat resistance. Methyl methacrylate is more preferred. The polymer block (a2) may be composed of one or two or more of these methacrylic esters.

As long as the object and advantageous effects of the present invention are not impaired, the polymer block (a2) may contain a monomer, such as a reactive group-containing methacrylic ester unit, e.g., glycidyl methacrylate or allyl methacrylate, or another polymerizable monomer unit other than the methacryl ester unit, e.g., acrylic ester, methacrylic acid, acrylic acid, an aromatic vinyl compound, acrylonitrile, methacrylonitrile, or olefin, as a comonomer in a small amount, preferably in an amount of 20% by mass or less, and more preferably 10% by mass or less.

The acrylic block copolymer (A) has, in its molecule, at least one (a2)-(a1)-(a2) structure having one polymer block (a1) mainly composed of an acrylic ester unit and two polymer blocks (a2) each mainly composed of a methacrylic ester unit. Examples of the molecular chain configuration of the acrylic block copolymer (A) include, but are not particularly limited to, linear, branched, and radial. Among these forms, a triblock structure represented by (a2)-(a1)-(a2) is preferably used. The molecular weights, the compositions, and so forth of polymer blocks (a2) bonded to both ends of polymer block (a1) may be the same or different.

As long as the object and advantageous effects of the present invention are not impaired, the acrylic block copolymer (A) may have a polymer block (c) derived from a monomer other than acrylic ester monomers and methacrylic ester monomers, the polymer block (c) serving as a polymer block different from these polymer blocks (a1) and (a2). Examples of the binding form of the polymer block (c), the polymer block (a1) mainly composed of an acrylic ester unit, and the polymer block (a2) mainly composed of a methacrylic ester unit include, but are not particularly limited to, a (a2)-((a1)-(a2))n-(c) structure and a (c)-(a2)-((a1)-(a2))n-(c) structure (wherein n represents an integer of 1 to 20).

Examples of a monomer constituting the polymer block (c) include olefins, such as ethylene, propylene, 1-butene, isobutylene, and 1-octene; conjugated diene compounds, such as 1,3-butadiene, isoprene, and myrcene; aromatic vinyl compounds, such as styrene, α-methylstyrene, p-methylstyrene, and m-methylstyrene; and vinyl acetate, vinylpyridine, acrylonitrile, methacrylonitrile, vinyl ketone, vinyl chloride, vinylidene chloride, vinylidene fluoride, acrylamide, methacrylamide, ε-caprolactone, and valerolactone.

The acrylic block copolymer (A) used in the present invention may contain a functional group, for example, a hydroxy group, a carboxy group, an acid anhydride moiety, and an amino group, in its molecular chain or at an end of its molecular chain, as needed.

The acrylic block copolymer (A) has a weight-average molecular weight of 10,000 to 100,000. From the viewpoint of improving the flexibility, moldability, and so forth of the thermoplastic polymer composition of the present invention and the sheet-like molded article composed of the thermoplastic polymer composition, the acrylic block copolymer (A) preferably has a weight-average molecular weight of 30,000 to 80,000 and more preferably 50,000 to 70,000. In the case where the acrylic block copolymer (A) has a weight-average molecular weight of less than 10,000, sufficient melt tension is not maintained during melt extrusion. This is less likely to lead to a satisfactory sheet-like molded article. Furthermore, the resulting sheet-like molded article has poor mechanical properties, such as breaking strength. A weight-average molecular weight exceeding 100,000 results in a molten resin with a higher viscosity. So, the sheet-like molded article produced by melt extrusion has a fine grain-like irregularity or a granular structure due to an unmelted substance (high-molecular weight polymer) on a surface thereof. Thus, a satisfactory sheet-like molded article is less likely to be produced.

The polymer block (a1) mainly composed of an acrylic ester unit in the acrylic block copolymer (A) preferably has a weight-average molecular weight of 2,000 to 80,000 and more preferably 5,000 to 70,000. The polymer block (a2) mainly composed of a methacrylic ester unit preferably has 2,000 to 80,000 and more preferably 5,000 to 70,000.

The ratio of the weight-average molecular weight (Mw) to the number-average molecular weight (Mn), i.e., (Mw/Mn), of the acrylic block copolymer (A) is preferably 1.01 or more and less than 1.50 and more preferably 1.01 or more and 1.35 or less. The use of the range significantly reduces the proportion of the unmelted substance that causes the granular structure in the sheet-like molded article composed of the thermoplastic polymer composition of the present invention.

The acrylic block copolymer (A) needs to be composed of a mixture of the two types of the acrylic block copolymers having the specific structures from the viewpoint of improving the surface smoothness and moldability of the sheet-like molded article composed of the thermoplastic polymer composition of the present invention. It is important to contain the acrylic block copolymer (A1) in which the proportion of the polymer block (a2) mainly composed of a methacrylic ester unit is in the range of 40% by mass or more and 80% by mass or less and to contain the acrylic block copolymer (A2) in which the proportion of the polymer block (a2) mainly composed of a methacrylic ester unit is 10% by mass or more and less than 40% by mass. If the acrylic block copolymer (A) contained in the thermoplastic polymer composition of the present invention is composed of the acrylic block copolymer (A1) alone, a periodic microphase-separated structure which is characteristic of the acrylic block copolymer (A1) is formed. It is thus presumed that the manifestation of anisotropy in the sheet-like molded article produced by melt extrusion causes streak-like irregularities on a surface of the sheet-like molded article, thereby reducing the surface smoothness. In particular, the acrylic block copolymer (A1) preferably has a polymer block (a2) content of 50% by mass or more and 65% by mass or less and more preferably 50% by mass or more and 55% by mass or less from the viewpoint of improving moldability, flexibility, transparency, and the transmittance of short-wavelength light. Furthermore, the acrylic block copolymer (A2) preferably has a polymer block (a2) content of 15% by mass or more and less than 40% by mass, and more preferably, 23% by mass or more and 35% by mass or less from the viewpoint of further improving the surface smoothness and moldability of the thermoplastic polymer composition of the present invention and the sheet-like molded article composed of the thermoplastic polymer composition. If the acrylic block copolymer (A1) has a polymer block (a2) content of less than 40% by mass, the compatibility with the acrylic resin (B) is reduced. This reduces the transmittance of short-wavelength light because of an increase in the loss of light, in particular, short-wavelength light, at a long path length in addition to reductions in transparency and moldability. If the acrylic block copolymer (A1) has a polymer block (a2) content exceeding 80% by mass, the thermoplastic polymer composition of the present invention and the sheet-like molded article composed of the thermoplastic polymer composition each have an increased elastic modulus and poor flexibility. If the acrylic block copolymer (A2) has a polymer block (a2) content of less than 10% by mass, the surface gluing of the thermoplastic polymer composition of the present invention and the sheet-like molded article composed of the thermoplastic polymer composition occurs, which is not appropriate for a molding material. If the acrylic block copolymer (A2) has a polymer block (a2) content of 40% by mass or more, the thermoplastic polymer composition of the present invention and the sheet-like molded article composed of the thermoplastic polymer composition each have an increased elastic modulus and poor flexibility.

Regarding proportions of the acrylic block copolymer (A1) and the acrylic block copolymer (A2) contained in the acrylic block copolymer (A), the acrylic block copolymer (A1) content is preferably 5% by mass or more, more preferably 10% by mass or more, and still more preferably 40% by mass or more with respect to the total amount of the acrylic block copolymer (A) from the viewpoint of improving moldability, flexibility, and the short-wavelength light transmittance of the thermoplastic polymer composition of the present invention and the sheet-like molded article composed of the thermoplastic polymer composition. The upper limit of the acrylic block copolymer (A1) content is not particularly limited but is usually 90% by mass or less, preferably 80% by mass or less, and more preferably 75% by mass or less. An acrylic block copolymer (A1) content of less than the range described above reduces the melt viscosity of the thermoplastic polymer composition of the present invention, so that the melt tension required for melt extrusion is not sufficiently maintained. Thus, a satisfactory sheet-like molded article is less likely to be produced. Furthermore, the acrylic block copolymer (A1) content of less than the range described above reduces the compatibility with the acrylic resin (B), and in particular, in the case of the use of the acrylic resin (B) having a melt flow rate of less than 15 g/10 min at 230° C. and 37.3 N, the transmittance of short-wavelength light is liable to be reduced because of an increase in the loss of light, in particular, short-wavelength light, at a long path length.

The acrylic block copolymer (A) preferably has an average polymer block (a2) content of 35% by mass or more and 80% by mass or less and more preferably 40% by mass or more and 70% by mass or less, and still more preferably 40% by mass or more and 60% by mass or less in view of transparency, flexibility, moldability, and surface smoothness. If the acrylic block copolymer (A) has an average polymer block (a2) content of less the range described above, the surface gluing of the thermoplastic polymer composition of the present invention and the sheet-like molded article composed of the thermoplastic polymer composition is likely to occur, which is not appropriate for a molding material. If the acrylic block copolymer (A) has an average polymer block (a2) content exceeding the range described above, the thermoplastic polymer composition of the present invention and the sheet-like molded article composed of the thermoplastic polymer composition each tend to have an increased modulus of elasticity in tension and to be poor flexibility.

A method for producing the acrylic block copolymer (A) is not particularly limited. A method according to a known technique may be employed. For example, a method by living polymerization of monomers constituting the respective blocks is general as a method of obtaining an acrylic block copolymer (B). Examples of the living polymerization include a method by anionic polymerization performed with an organic alkali metal compound serving as a polymerization initiator in the presence of a mineral acid salt, such as a salt of an alkali metal or an alkaline-earth metal (see PTL 9); a method by anionic polymerization performed with an organic alkali metal compound serving as a polymerization initiator in the presence of an organic aluminum compound (see PTL 10); a method by polymerization performed with an organic rare-earth metal complex serving as a polymerization initiator (see PTL 11); and a method by radical polymerization performed with an α-halogenated ester compound serving as an initiator in the presence of a copper compound (see NPL 1). Furthermore, an example thereof is a method in which a monomer constituting each block is polymerized with a polyvalent radical polymerization initiator or a polyvalent radical chain transfer agent to produce a mixture containing the acrylic block copolymer (A) of the present invention. Among these methods, in particular, a method by anionic polymerization performed with an organic alkali metal compound serving as a polymerization initiator in the presence of an organic aluminum compound is recommended because of the production of an acrylic block copolymer in high purity, easy control of the molecular weight and the compositional ratio, and economy.

The acrylic resin (B) serving as a component in the present invention is an acrylic resin mainly composed of a methacrylic ester unit. The acrylic resin (B) is preferably a homopolymer of a methacrylic ester or a copolymer mainly composed of a methacrylic ester unit from the viewpoint of improving the transparency, moldability, and so forth of the thermoplastic polymer composition of the present invention and the sheet-like molded article composed of the thermoplastic polymer composition. Examples of a methacrylic ester contained in the acrylic resin (B) as a main component include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, and 2-methoxyethyl methacrylate. Among these compounds, alkyl methacrylates, such as methyl methacrylate, ethyl methacrylate, isopropyl methacrylate, n-butyl methacrylate, tert-butyl methacrylate, cyclohexyl methacrylate, and isobornyl methacrylate, are preferred in view of the compatibility with the acrylic block copolymer contained in the thermoplastic polymer composition of the present invention and the transparency and moldability of the thermoplastic polymer composition. Methyl methacrylate is more preferred. One or two or more of these methacrylic esters may be used.

As long as the object and advantageous effects of the present invention are not impaired, a reactive group-containing polymerizable monomer unit, for example, a monomer, e.g., glycidyl methacrylate or allyl methacrylate, may be contained as a methacrylic ester unit in the acrylic resin (B) in a small amount, preferably in an amount of 20% by mass or less, and more preferably 10% by mass or less.

In the case where the acrylic resin (B) is a copolymer mainly composed of a methacrylic ester unit, examples of another monomer copolymerizable with the methacrylic ester contained in the copolymer include, but are not particularly limited to, acrylic esters, such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate; unsaturated carboxylic acids, such as methacrylic acid, acrylic acid, and maleic anhydride; olefins, such as ethylene, propylene, 1-butene, isobutylene, and 1-octene; conjugated diene compounds, such as 1,3-butadiene, isoprene, and myrcene; aromatic vinyl compounds, such as styrene, α-methylstyrene, p-methylstyrene, and m-methylstyrene; and vinyl acetate, vinylpyridine, acrylonitrile, methacrylonitrile, vinyl ketone, vinyl chloride, vinylidene chloride, vinylidene fluoride, acrylamide, and methacrylamide. One or two or more of these monomers may be used.

In the case where the acrylic resin (B) is a copolymer, a copolymerization method is not particularly limited. For example, random copolymerization, block copolymerization, or alternating copolymerization is commonly employed. With respect to the thermoplastic polymer composition of the present invention and the sheet-like molded article composed of the thermoplastic polymer composition, in the case where a diblock copolymer composed of a methacrylic ester polymer block and an acrylic ester polymer block is used as the acrylic resin (B), it is possible to produce the thermoplastic polymer composition and the sheet-like molded article composed of the thermoplastic polymer composition that are excellent in bond performance or adhesion performance.

The stereoregularity of the acrylic resin (B) is not particularly limited. The acrylic resin (B) that the stereoregularity of it is isotactic, heterotactic, or syndiotactic may be used.

The weight-average molecular weight of the acrylic resin (B) is not particularly limited but is usually preferably in the range of 30,000 to 500,000 and more preferably 70,000 to 200,000. Furthermore, the acrylic resin (B) used in the present invention may be used alone. Alternatively, a mixture of two or more types of acrylic resins having a difference in weight-average molecular weight or the like may be used.

The flowability of the acrylic resin (B) used in the present invention is not particularly limited. The melt flow rate is preferably 15 g/10 min or more at 230° C. and 37.3 N from the viewpoint of improving the short-wavelength light transmittance of the thermoplastic polymer composition of the present invention and the sheet-like molded article composed of the thermoplastic polymer composition. The upper limit of the melt flow rate is not particularly limited. In the case where a difference in melt viscosity between the acrylic resin (B) and the acrylic block copolymer (A) is increased and where the melt flow rate is excessively large, in particular, sufficient melt tension is not maintained during melt extrusion. So, a satisfactory molded article is less likely to be produced. Furthermore, the resulting molded article is poor in breaking strength and so forth. Thus, the melt flow rate is preferably 40 g/10 min or less, more preferably 15 g/10 min or more and 30 g/10 min or less, and still more preferably 15 g/10 min or more and 25 g/10 min or less. Meanwhile, the use of the acrylic resin (B) having a melt flow rate of less than 15 g/10 min at 230° C. and 37.3 N provides the effect of improving the transparency and surface smoothness of the sheet-like molded article produced by extrusion.

A commercially available product may be used as the acrylic resin (B) used in the present invention. Examples of the commercially available acrylic resin include "PARAPET H1000B" (MFR: 22 g/10 min (230° C., 37.3 N)), "PARAPET GF" (MFR: 15 g/10 min (230° C., 37.3 N)), "PARAPET EH" (MFR: 1.3 g/10 min (230° C., 37.3 N)), "PARAPET HRL" (MFR: 2.0 g/10 min (230° C., 37.3 N)), and "PARAPET G" (MFR: 8.0 g/10 min (230° C., 37.3 N)) (all are trade names, manufactured by Kuraray Co., Ltd).

The mass ratio of the acrylic block copolymer (A) to the acrylic resin (B), i.e., [(A)/(B)], in each of the thermoplastic polymer composition of the present invention and the sheet-like molded article composed of the thermoplastic polymer composition is in the range of 97/3 to 10/90. If the proportion of the acrylic resin (B) is lower than the range described above (if the proportion of the acrylic block copolymer (A) is higher than the range described above), fine streak-like irregularities are formed on a surface of the sheet-like molded article produced by melt extrusion with a T-die. Thus, the sheet-like molded article having satisfactory surface smoothness is less likely to be produced. Meanwhile, if the proportion of the acrylic resin (B) is higher than the range described above (if the proportion of the acrylic block copolymer (A) is lower than the range described above), the thermoplastic polymer composition of the present invention and the sheet-like molded article composed of the thermoplastic polymer composition each have an increased modulus of elasticity in tension and reduced flexibility. The mass ratio of the acrylic block copolymer (A) to the acrylic resin (B) is preferably in the range of 95/5 to 10/90, more preferably 90/10 to 20/80, and still more preferably 85/15 to 30/70 from the viewpoint of achieving satisfactory moldability and flexibility of the thermoplastic polymer composition and the sheet-like molded article composed of the thermoplastic polymer composition. In particular, from the viewpoint of attaching importance to flexibility, the mass ratio of the acrylic block copolymer (A) to the acrylic resin (B) is preferably in the range of 85/15 to 50/50, more preferably 85/15 to 60/40, and still more preferably 80/20 to 65/35.

Preferably, each of the thermoplastic polymer composition of the present invention and the sheet-like molded article composed of the thermoplastic polymer composition consists of the acrylic block copolymer (A) and the acrylic resin (B). As long as the advantageous effects of the present invention are not impaired, another polymer may be contained, as needed, in addition to the acrylic block copolymer (A) and the acrylic resin (B). Examples of another polymer include olefin resins, such as polyethylene, polypropylene, polybutene-1, poly-4-methylpentene-1, and polynorbornene; ethylene ionomers; styrene resins, such as polystyrene, styrene-maleic anhydride copolymers, high impact polystyrene, AS resins, ABS resins, AES resins, AAS resins, ACS resins, and MBS resins; methyl methacrylate-styrene copolymers; polyester resins, such as polyethylene terephthalate, polybutylene terephthalate, and poly(lactic acid); polyamide resins, such as nylon 6, nylon 66, and polyamide elastomers; polyurethane resins, such as ester-based polyurethane elastomers, ether-based polyurethane elastomers, non-yellowed ester-based polyurethane elastomers, and non-yellowed carbonate-based polyurethane elastomers; and polycarbonates, polyvinyl chloride, polyvinylidene chloride, polyvinyl alcohol, ethylene-vinyl alcohol copolymers, polyacetals, polyvinylidene fluoride, modified polyphenylene ethers, polyphenylene sulfide, and silicone rubber-modified resins. Among these compounds, AS resins and polyvinylidene fluoride are preferably used in view of the compatibility with the acrylic block copolymer contained in the thermoplastic polymer composition of the present invention.

Furthermore, each of the thermoplastic polymer composition of the present invention and the sheet-like molded article composed of the thermoplastic polymer composition may contain various known additives (e.g., rubber, a lubricant, an antioxidant, a light stabilizer, a colorant, an antistatic agent, and a flame retardant), fillers (e.g., a fibrous reinforcing agent, such as glass fibers, and an inorganic filler), and so forth as long as the advantageous effects of the present invention are not impaired. Specific examples of robber that can be incorporated include acrylic rubber; silicone rubber; styrene thermoplastic elastomers, such as SEPS, SEBS, and SIS; and olefin rubber, such as IR, EPR, and EPDM. One or more of these compounds may be used. Examples of other additives and fillers that can be incorporated include mineral oil softeners, such as paraffin oil and naphthene oil, for improving flowability during molding; inorganic fillers, such as calcium carbonate, talc, carbon black, titanium oxide, silica, clay, barium sulfate, and magnesium carbonate, for the purpose of improving heat resistance, weatherability, and so forth or serving as extenders; inorganic fibers or organic fibers for reinforcement, such as glass fibers and carbon fibers; heat stabilizers; antioxidants; light stabilizers; adhesives; tackifiers; plasticizers; antistatic agents; foaming agents; colorants; and stains. Among these additives, preferably, a heat stabilizer, an antioxidant, and so forth are practically added in order to achieve further satisfactory heat resistance and weatherability.

A method for preparing the thermoplastic polymer composition of the present invention is not particularly limited. To increase the dispersibility of each component contained in the thermoplastic polymer composition, a method in which mixing is performed by melt kneading is recommended. An example of the preparation method is a method in which the acrylic block copolymer (A) and the acrylic resin (B) are melt-kneaded. They may be mixed together with another polymer and the additives described above, as needed. Alternatively, after mixing the acrylic block copolymer (A) with another polymer and the additives described above, the resulting mixture may be mixed with the acrylic resin (B). The mixing operation may be performed with a known mixer or kneader, for example, a kneader-ruder, an extruder, a mixing roll, or a Banbury mixer. In particular, a twin-screw extruder is preferably used from the viewpoint of improving kneading properties and compatibility of the acrylic block copolymer (A) and the acrylic resin (B). The temperature at the time of mixing and kneading is appropriately adjusted, in response to, for example, melting temperatures of the acrylic block copolymer (A), the acrylic resin (B), and so forth. Usually, the mixing may be performed in the temperature range of 110° C. to 300° C. In this way, the thermoplastic polymer composition of the present invention can be produced in a desired form, such as pellets or a powder. The thermoplastic polymer composition in the form of pellets, a powder, or the like is suitably used as a molding material.

The thermoplastic polymer composition may be subjected to any process, such as a melt molding method, for example, a T-die method (e.g., lamination or coextrusion), an inflation method (e.g., coextrusion), compression molding, blow molding, calendering, vacuum molding, or injection molding (e.g., insert molding, a two-color method, pressing, a core back method, or a sandwich method), or a solution casting method, thereby producing the sheet-like molded article. Melt extrusion using the T-die method or the inflation method is preferred in view of production steps, cost, and so forth. The T-die method is more preferred because of its excellent productivity and thickness accuracy.

A T-die is not particularly limited. Examples thereof include known dies, such as a coat hanger die and a straight die. Examples of a material for the die include, but are not limited to, SCM-based steel and stainless steel, such as SUS.

In the case of a production process using the T-die method, a melt-extrusion apparatus, such as a single- or twin-screw extruder, may be used. The melt extrusion temperature at which the sheet-like molded article of the present invention is produced is preferably in the range of 100° C. to 350° C. and more preferably 150° C. to 300° C. In the case where melt kneading is performed with the melt extrusion apparatus, melt kneading is preferably performed under reduced pressure or under a stream of nitrogen using a vent from the viewpoint of inhibiting coloring. Note that drawing can be performed in the uniaxial or biaxial direction simultaneously with or after extrusion.

The sheet-like molded article composed of the thermoplastic polymer composition of the present invention is a molded article produced by molding the thermoplastic polymer composition into a sheet-like shape. In general, a sheet-like molded article having a thickness of 0.005 mm or more and 0.25 mm or less is referred to as a film. A sheet-like molded article having a thickness exceeding 0.25 mm is referred to as a sheet. The thickness of the sheet-like molded article of the present invention is preferably in the range of 0.025 mm or more and 10 mm or less and more preferably 0.05 mm or more and 5 mm or less in view of flexibility and so forth.

In the case where the sheet-like molded article composed of the thermoplastic polymer composition of the present invention has an average transmittance of light with a wavelength of 400 nm to 500 nm of 40% or more, provided that the average transmittance is measured by a spectral transmittance measurement method with a D65 light source at a viewing angle of 2 degrees, a measurement temperature of 25° C., and an optical path length of 15 mm, the dependence of light transmittance on wavelength is reduced. That is, the difference between light transmittance in the wavelength range of 400 nm to 500 nm and light transmittance in the wavelength range of 501 nm to 780 nm is reduced. So, the sheet-like molded article may be suitably used as an optical member configured to guide light from the longitudinal direction of the molded article.

Applications of the thermoplastic polymer composition of the present invention and the sheet-like molded article composed of the thermoplastic polymer composition are not particularly limited. They may be used for a variety of applications to an optic filed, a food field, a medical field, a civilian field, an automotive field, electric and electronic fields, and so forth. In particular, the sheet-like molded article of the present invention is excellent in surface smoothness, moldability, flexibility, and optical properties, for example, the transmittance of short-wavelength light. Thus, the sheet-like molded article may be suitably used in known optical applications, for example, various covers, various terminal boards, printed circuit boards, speakers, and optical apparatuses, such as microscopes, binoculars, cameras, and clocks. Furthermore, the sheet-like molded article may be suitably used as a component related to imaging, optical recording, optical communication, and information devices. Examples of the component include finders for cameras, VTRs, and projection television sets, filters, prisms, Fresnel lenses, protective films for substrates of various optical disks (e.g., VDs, CDs, DVDs, MDs, and LDs), optical switches, optical connectors, liquid crystal displays, light-guiding films and sheets for liquid crystal displays, flat-panel displays, light-guiding films and sheets for flat-panel displays, plasma displays, light-guiding films and sheets for plasma displays, retardation films and sheets, polarizing films and sheets, protective films and sheets for polarizing plates, wave plates, light-diffusing films and sheets, prism films and sheets, reflective films and sheets, antireflective films and sheets, viewing angle-enlarging films and sheets, anti-glare films and sheets, luminance-improving films and sheets, substrates for liquid-crystal and electroluminescent display devices, touch panels, light-guiding films and sheets for touch panels, various front plates, and spacers between various modules. Specifically, the sheet-like molded article may be used for, for example, various liquid-crystal display devices, electroluminescent display devices, and touch panels of cellular phones, digital information devices, pagers, navigation, automotive-use liquid-crystal displays, liquid-crystal display monitors, dimmer panels, displays for OA equipment, and displays for AV equipment. Furthermore, the sheet-like molded article may be suitably used for, for example, known building materials, such as interior and exterior members for building use, curtain walls, roofing members, roofing materials, window members, gutters, exteriors, wall materials, floor materials, furnishing materials, members for the construction of roads, retroreflecting films and sheets, agricultural films and sheets, lighting covers, signs, and transparent sound barriers because of its excellent weatherability, flexibility, and so forth.

The sheet-like molded article composed of the thermoplastic polymer composition of the present invention may be used alone. A plurality of sheet-like molded articles may be used in combination. Alternatively, the sheet-like molded article may be used in combination with a member other than the sheet-like molded article of the present invention.

The sheet-like molded article composed of the thermoplastic polymer composition of the present invention may be used as a single layer or a laminate including two or more layers. In the case where the sheet-like molded article is used as a laminate, only the sheet-like molded articles of the present invention may be laminated. Alternatively, the sheet-like molded article of the present invention and another material may be laminated. In the case of molding the laminate, each layer may be produced by a known method. That is, examples of a known method include coextrusion using extrusion, such as a T-die method or an inflation method; fusing methods, such as heat fusion, ultrasonic fusion, and high-frequency fusion; and methods using known adhesives that are cured by ultraviolet rays, heat, radiation, and so forth. A surface to be fused or bonded may be subjected to corona discharge treatment, plasma treatment, or the application of a known primer. In the case of molding the laminate, the order of lamination, printing or the formation of a surface form, and cutting to a target size is not particularly limited. In the case where the sheet-like molded article of the present invention is combined with another material to form an optical component, such as a laminated optical component, the another material may be appropriately selected in response to desired properties. Examples of the another material that can be used include organic compounds, polymers, inorganic substances, and compositions containing these materials. Specifically, for example, in the case where the sheet-like molded article of the present invention and the another material are laminated to form an optical component, examples of the another material that can be used include commercially available materials and known materials, for example, organic compounds, such as hard coat materials, antireflective materials, and liquid crystals, and compositions thereof; organic polymers, such as ring-opened polymers of cyclic olefins and hydrogenated compounds thereof, cyclic olefin polymers prepared by addition polymerization, aliphatic olefin resins, acrylic polymers, polycarbonate resins, and liquid-crystal polymers, and compositions thereof; and inorganic substances, such as soda glass and silica glass, and compositions thereof.

EXAMPLES

While the present invention will be specifically described below, the present invention is not limited thereto. Note that various physical properties in examples and comparative examples were measured or evaluated by methods described below.

(1) Weight-Average Molecular Weight (Mw)

The weight-average molecular weight (Mw) of each of the acrylic block copolymers (A1) and (A2) and the acrylic resin (B) was determined by gel permeation chromatography (hereinafter, abbreviated as "GPC") expressed relative to polystyrene standards.

Apparatus: GPC apparatus "HLC-8020", manufactured by Tosoh Corporation
    Separation column: series-connected "TSKgel GMHXL", "G4000HXL", and "G5000HXL" (manufactured by Tosoh Corporation)
    Eluent: tetrahydrofuran
    Eluent flow rate: 1.0 ml/min
    Column temperature: 40° C.
    Detection method: differential refractometer (RI)

(2) Melt Flow Rate (MFR)

The melt flow rate (MFR) of the acrylic resin (B) was measured according to ISO 1133 at 230° C., 37.3 N, and 10 minutes.

(3) Proportions of Individual Polymer Blocks

Proportions of individual polymer blocks in an acrylic block polymer were determined by $^1$H-NMR ($^1$H-nuclear magnetic resonance) measurement.

Apparatus: nuclear magnetic resonance apparatus "JNM-LA400", manufactured by JEOL Ltd.
    Deuterated solvent: deuterated chloroform (4) Transparency Thermoplastic polymer compositions prepared in examples and comparative examples described below were each molded into a 0.1-mm-thick sheet-like molded article using a T-die extruder at cylinder and die temperatures of 220° C. A 50 mm×50 mm specimen was cut from each of the resulting sheet-like molded articles. The haze value and the total luminous transmittance were measured according to JIS K7105 with a direct-reading haze meter (manufactured by Nippon Denshoku Industries Co., Ltd).

(5) Flexibility (Modulus of Elasticity in Tension)

Thermoplastic polymer compositions prepared in examples and comparative examples described below were each molded into a 0.1-mm-thick sheet-like molded article using a T-die extruder at cylinder and die temperatures of 220° C. A specimen (JIS type 3) was cut from each of the resulting sheet-like molded articles with a die cutter. The modulus of elasticity in tension was measured according to JIS K7127.

(6) Surface Smoothness

Thermoplastic polymer compositions prepared in examples and comparative examples described below were each molded into a 0.1-mm-thick sheet-like molded article using a T-die extruder at cylinder and die temperatures of 220° C. The surface state of each of the resulting sheet-like molded articles was visually evaluated. The evaluation was used as an index of the surface smoothness.

◯: The surface is smooth.

Δ: Although the surface is almost smooth, the surface partially has streak- or grain-like irregularities.

×: The surface has streak- or grain-like irregularities and is not smooth.

(7) Moldability

When thermoplastic polymer compositions prepared in examples and comparative examples described below were each molded into a 0.1-mm-thick sheet-like molded article using a T-die extruder at cylinder and die temperatures of 220° C., the state of production of the sheet-like molded article was visually evaluated. The evaluation was used as an index of the moldability.

◯: The state of production of the sheet-like molded article is satisfactory.

Δ: Although changes in thickness and extruder output are small, the melt viscosity is high, and the molding range is narrow.

×: Nonuniformity in thickness due to a surging phenomenon and the nonuniformity of discharge at both end portions of the sheet-like molded article due to a draw resonance phenomenon are observed.

(8) Average Transmittance of Light with Wavelength of 400 nm to 500 nm at Optical Path Length of 15 mm Thermoplastic polymer compositions prepared in examples and comparative examples described below were each molded into a 3-mm-thick sheet-like molded article using a T-die extruder at cylinder and die temperatures of 220° C. The resulting sheet-like molded articles were laminated so as to have a thickness of 15 mm. The light transmittance was measured with a spectrophotometer (manufactured by Hitachi High-Technologies Corporation) using a D65 light source at a viewing angle of 2 degrees and a temperature of 25° C.

In synthesis examples described below, compounds were dried and purified in the usual manner and degassed with nitrogen before use. The transfer and feed of the compounds were performed in a nitrogen atmosphere.

Reference Example 1

Preparation of Organic Aluminum Compound: isobutylbis(2,6-di-tert-butyl-4-methylphenoxy)aluminum Into a 200-ml flask whose inner atmosphere was replaced with argon, dry toluene (25 ml) prepared by distillation in an argon atmosphere after drying over sodium and 2,6-di-tert-butyl-4-methylphenol (11 g) were charged. The mixture was dissolved under stirring at room temperature. Triisobutylaluminum (6.8 ml) was added to the resulting solution, followed by stirring at 80° C. for about 18 hours to prepare a toluene solution containing the corresponding organic aluminum compound [isobutylbis(2,6-di-tert-butyl-4-methylphenoxy) aluminum] in a concentration of 0.6 mol/l.

Reference Example 2

Synthesis of Acrylic Block Copolymer (A1)

A 2-L three-necked flask was equipped with a three-way stop-cock, evacuated, and purged with nitrogen. Dry toluene (1040 g), 1,2-dimethoxyethane (100 g), and the toluene solution (45 g) containing isobutylbis(2,6-di-tert-butyl-4-methylphenoxy)aluminum (30 mmol) prepared in Reference Example 1 were added thereto at room temperature, followed by further addition of sec-butyllithium (7.3 mmol). Then methyl methacrylate (64 g) was added thereto. After the mixture was reacted at room temperature for 1 hour, the reaction mixture (0.1 g) was collected as sample 1. Subsequently, the internal temperature of the polymer solution was cooled to −25° C. Then n-butyl acrylate (184 g) was added dropwise thereto over a period of 2 hours. After completion of the dropwise addition, the reaction mixture (0.1 g) was collected as sample 2. Subsequently, methyl methacrylate (161 g) was added to the reaction mixture. The reaction mixture was allowed to reach room temperature and stirred for 8 hours. Methanol (4 g) was added to the reaction mixture to terminate the polymerization. After the termination of the polymerization, the reaction mixture was poured into a large amount of methanol to form a precipitate. The precipitate was defined as sample 3. Samples 1 to 3 were subjected to $^1$H-NMR measurement and GPC measurement. The weight-average molecular weight (Mw), the molecular weight distribution (Mw/Mn), the mass ratio of a methyl methacrylate polymer (PMMA) block to a n-butyl acrylate polymer (PnBA) block, and so forth were determined on the basis of the results. The precipitate obtained in the end was a triblock copolymer (PMMA-b-PnBA-b-PMMA) with a PMMA block-PnBA block-PMMA block structure. A 1st-PMMA block portion obtained by the polymerization of the monomer (MMA) that had first been fed had a weight-average molecular weight (Mw) of 9,700. The value of Mw/Mn was 1.08. The triblock copolymer had a weight-average molecular weight (Mw) of 62,000. The value of Mw/Mn was 1.11. The proportions of the polymer blocks were as follows: PMMA (14% by mass)-PnBA (50% by mass)-PMMA (36% by mass).

Reference Example 3

Synthesis of Acrylic Block Copolymer (A2)

A 2-L three-necked flask was equipped with a three-way stop-cock, evacuated, and purged with nitrogen. Dry toluene (1040 g), 1,2-dimethoxyethane (100 g), and the toluene solution (48 g) containing isobutyl bis(2,6-di-tert-butyl-4-methylphenoxy)aluminum (32 mmol) prepared in Reference Example 1 were added thereto at room temperature, followed by further addition of sec-butyl lithium (8.1 mmol). Then methyl methacrylate (72 g) was added thereto. After the mixture was reacted at room temperature for 1 hour, the reaction mixture (0.1 g) was collected as sample 4. Subsequently, the internal temperature of the polymer solution was cooled to −25° C. Then n-butyl acrylate (307 g) was added dropwise thereto over a period of 2 hours. After completion of the dropwise addition, the reaction mixture (0.1 g) was collected as sample 5. Subsequently, methyl methacrylate (72 g) was added to the reaction mixture. The reaction mixture was allowed to reach room temperature and stirred for 8 hours. Methanol (4 g) was added to the reaction mixture to terminate the polymerization. After the termination of the polymerization, the reaction mixture was poured into a large amount of methanol to form a precipitate. The precipitate was defined as sample 6. Samples 4 to 6 were subjected to $^1$H-NMR measurement and GPC measurement. The weight-average molecular weight (Mw), the molecular weight distribution (Mw/Mn), the mass ratio of a methyl methacrylate polymer (PMMA) block to a n-butyl acrylate polymer (PnBA) block, and so forth were determined on the basis of the results. The precipitate obtained in the end was a triblock copolymer (PMMA-b-PnBA-b-PMMA) with a PMMA block-PnBA block-PMMA block structure. A 1st-PMMA block portion obtained by the polymerization of the monomer (MMA) that had first been fed had a weight-average molecular weight (Mw) of 9,900. The value of Mw/Mn was 1.08. The triblock copolymer had a weight-average molecular weight (Mw) of 62,000. The value of Mw/Mn was 1.19. The proportions of the polymer blocks were as follows: PMMA (16% by mass)-PnBA (68% by mass)-PMMA (16% by mass).

Examples 1 to 11 and Comparative Examples 1 to 4

The acrylic block copolymers (A1) and (A2) obtained in Reference Examples and acrylic resins (B)-1 ("PARAPET H1000B", manufactured by Kuraray Co., Ltd., MFR: 22 g/10 min (230° C., 37.3 N)), (B)-2 ("PARAPET GF", manufactured by Kuraray Co., Ltd., MFR: 15 g/10 min (230° C., 37.3 N)), (B)-3 ("PARAPET EH", manufactured by Kuraray Co., Ltd., MFR: 1.3 g/10 min (230° C., 37.3 N)), (B)-4 ("PARAPET HRL", manufactured by Kuraray Co., Ltd., MFR: 2.0 g/10 min (230° C., 37.3 N)), and (B)-5 (PARAPET G", manufactured by Kuraray Co., Ltd., MFR: 8.0 g/10 min (230° C., 37.3 N)) were mixed so as to achieve compositions shown in Table 1. Each of the mixtures was melt-kneaded with a twin-screw extruder at 230° C. and extruded, followed by cutting to produce pellets composed of a thermoplastic polymer composition. The pellets were subjected to T-die extrusion at 190° C. to 210° C. to produce sheet-like molded articles each having a thickness of 0.1 mm or 3 mm. A specimen was taken from each of the sheet-like molded articles. The flexibility, transparency, surface smoothness, and the average transmittance of light with a wavelength of 400 nm to 500 nm at optical path length of 15 mm were measured or evaluated. Tables 1 and 2 show the results.

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Thermoplastic polymer composition | | | | | | | | | | | |
| Acrylic block copolymer (A) | | | | | | | | | | | |
| Acrylic block copolymer (A1) | 40 | 50 | 50 | 47 | 50 | 47 | 50 | 60 | 47 | 50 | 60 |
| Acrylic block copolymer (A2) | 40 | 20 | 20 | 20 | 20 | 20 | 20 | 10 | 20 | 20 | 10 |
| Acrylic resin (B) | | | | | | | | | | | |
| Acrylic resin (B)-1 | 20 | 30 | | | | | | | | | |
| Acrylic resin (B)-2 | | | 30 | | | | | | | | |
| Acrylic resin (B)-3 | | | | 33 | 30 | | | | | | |
| Acrylic resin (B)-4 | | | | | | 33 | 30 | 30 | | | |
| Acrylic resin (B)-5 | | | | | | | | | 33 | 30 | 30 |
| Acrylic block copolymer (A1) content (% by mass) of acrylic block copolymer (A) | 50 | 71 | 71 | 70 | 71 | 70 | 71 | 86 | 70 | 71 | 86 |
| Average polymer block (a2) content of acrylic block copolymer (A) | 41 | 45 | 45 | 45 | 45 | 45 | 45 | 47 | 45 | 45 | 47 |
| Sheet-like molded article | | | | | | | | | | | |
| Transparency | | | | | | | | | | | |
| Haze value (%) | 0.6 | 0.6 | 0.7 | 0.9 | 0.9 | 0.7 | 0.9 | 0.6 | 0.7 | 0.9 | 0.6 |
| Total luminous transmittance (%) | 93.4 | 93.7 | 93.5 | 93.1 | 93.1 | 92.9 | 93.1 | 93.7 | 93.0 | 93.0 | 93.0 |
| Flexibility | | | | | | | | | | | |
| Modulus of elasticity in tension (MPa) | 200 | 400 | 400 | 400 | 500 | 400 | 500 | 600 | 400 | 500 | 600 |
| Surface smoothness | ○ | ○ | ○ | ○ | ○ | ○ | ○ | ○ | ○ | ○ | ○ |
| Moldability | ○ | ○ | ○ | ○ | ○ | ○ | ○ | ○ | ○ | ○ | ○ |
| Average transmittance (%) of light with wavelength of 400 nm to 500 nm at optical path length of 15 mm | 58 | 54 | 48 | 18 | 18 | 29 | 29 | 30 | 29 | 29 | 30 |

TABLE 2

| | Comparative Example 1 | Comparative Example 2 | Comparative Example 3 | Comparative Example 4 |
|---|---|---|---|---|
| Thermoplastic polymer composition | | | | |
| Acrylic block copolymer (A) | | | | |
| Acrylic block copolymer (A1) | 100 | 70 | 70 | 70 |
| Acrylic block copolymer (A2) | | 30 | | |
| Acrylic resin (B) | | | | |
| Acrylic resin (B)-1 | | | | |
| Acrylic resin (B)-2 | | | 30 | |
| Acrylic resin (B)-3 | | | | 30 |
| Acrylic resin (B)-4 | | | | |
| Acrylic resin (B)-5 | | | | |
| Acrylic block copolymer (A1) content (% by mass) of acrylic block copolymer (A) | 100 | 70 | 100 | 100 |
| Average polymer block (a2) content of acrylic block copolymer (A) | 50 | 45 | 50 | 50 |
| Sheet-like molded article | | | | |
| Transparency | | | | |
| Haze value (%) | 5.9 | 5.0 | 22.0 | 1.3 |
| Total luminous transmittance (%) | 91.8 | 92.0 | 91.8 | 93.2 |
| Flexibility | | | | |
| Modulus of elasticity in tension (MPa) | 650 | 200 | 1400 | 1300 |
| Surface smoothness | x | x | x | Δ |
| Moldability | x | x | x | Δ |
| Average transmittance (%) of light with wavelength of 400 nm to 500 nm at optical path length of 15 mm | 10 | 15 | 8 | 25 |

The results shown in Tables 1 and 2 demonstrate as follows: The use of the thermoplastic polymer compositions obtained in Examples 1 to 3 of the present invention results in the sheet-like molded articles having excellent transparency and surface smoothness and an excellent balance with the transmittance of short-wavelength light without impairing flexibility. In contrast, in Comparative Example 1, because the resulting article consists of the acrylic block copolymer (A1) and do not contain the acrylic resin (B), fine streak-like irregularities are molded on a surface of the sheet-like molded article during extrusion. So, the resulting sheet-like molded article is not satisfactory and has a low average transmittance of light with a wavelength of 400 nm to 500 nm at optical path length of 15 mm. In Comparative Example 2, because the resulting article consists of the acrylic block copolymer (A1) and the acrylic block copolymer (A2), fine streak-like irregularities are formed on a surface of the sheet-like molded article during extrusion. So, the resulting sheet-like molded article is not satisfactory and has a low average transmittance of light with a wavelength of 400 nm to 500 nm at optical path length of 15 mm. In Comparative Example 3, the resulting article consists of the acrylic block copolymer (A1) and the acrylic resin (B) having a MFR of 15 g/10 min or more and thus has poor flexibility and transparency. Furthermore, fine streak-like irregularities are formed on a surface of the sheet-like molded article during extrusion. So, the resulting sheet-like molded article is not satisfactory and has a low average transmittance of light with a wavelength of 400 nm to 500 nm at optical path length of 15 mm. In Comparative Example 4, the resulting article consists of the acrylic block copolymer (A1) and the acrylic resin (B) having a MFR of less than 15 g/10 min and thus has poor flexibility. Furthermore, the surface smoothness and moldability tend to be inferior to those in Examples 1 to 11. In each of Examples 4 to 11, the acrylic resin (B)-3, the acrylic resin (B)-4, or the acrylic resin (B)-5, which has a melt flow rate of less than 15 g/10 min at 230° C. and 37.3 N, is contained. Thus, when extrusion is performed, the resulting sheet-like molded article has satisfactory surface smoothness as in Examples 1 to 3. Furthermore, the sheet-like molded article tends to have a high average transmittance of light with a wavelength of 400 nm to 500 nm compared with those of the sheet-like molded articles obtained in Comparative Examples 1 to 4. In each of Examples 4 to 11, the compatibility of the acrylic block copolymer (A) and the acrylic resin (B)-3, the acrylic resin (B)-4, or the acrylic resin (B)-5 tends to be somewhat low. Thus, in particular, the loss of short-wavelength light tends to be increased at a long path length. Furthermore, the average transmittance of light with a wavelength of 400 nm to 500 nm tends to be reduced compared with each of Examples 1 to 3, in which the acrylic resins each having a melt flow rate of 15 g/10 min or more are used.

INDUSTRIAL APPLICABILITY

A thermoplastic polymer composition of the present invention has excellent surface smoothness, moldability, flexibility, and a high transmittance of short-wavelength light, and thus is suitable as a molding material. Furthermore, a sheet-like molded article composed of the thermoplastic polymer composition of the present invention has excellent flexibility and a high transmittance of short-wavelength light and thus is suitably used for various applications.

The invention claimed is:

1. A thermoplastic polymer composition, comprising:
an acrylic block copolymer (A; and
an acrylic resin (B),
wherein
(i) the acrylic block copolymer (A) comprises, in its molecule, at least one structure where polymer blocks (a2), mainly comprising, in polymerized form, a methacrylic ester unit, are bonded to both ends of a polymer block (a1) mainly comprising, in polymerized form, an acrylic ester unit,
(ii) the acrylic block copolymer (A) has a weight-average molecular weight of 10,000 to 100,000,
(iii) the acrylic block copolymer (A) comprises:
an acrylic block copolymer (A1) comprising a polymer block (a2) content of 40% by mass or more and 80% by mass or less; and
an acrylic block copolymer (A2) comprising a polymer block (a2) content of 10% by mass or more and less than 40% by mass,
(iv) the acrylic resin (B) mainly comprises, in polymerized form, a methacrylic ester unit, and
(v) a mass ratio of the acrylic block copolymer (A) to the acrylic resin (B), [(A)/(B)], is in a range of 97/3 to 10/90.

2. The composition of claim 1, wherein the acrylic resin (B) has a melt flow rate of 15 g/10 min or more at 230° C. and 37.3 N.

3. The composition of claim 1, wherein the acrylic resin (B) has a melt flow rate of less than 15 g/10 min at 230° C. and 37.3 N.

4. The composition of claim 1, wherein a proportion of the acrylic block copolymer (A1) is 5% by mass or more with respect to a total amount of the acrylic block copolymer (A).

5. A molded article, comprising the thermoplastic polymer composition of claim 1,
wherein the article is in a sheet form.

6. The article of claim 5, having an average transmittance of light with a wavelength of 400 nm to 500 nm of 40% or more, provided that the average transmittance is measured by a spectral transmittance measurement method with a D65 light source at a viewing angle of 2 degrees, a measurement temperature of 25° C, and an optical path length of 15 mm.

7. The composition of claim 2, wherein a proportion of the acrylic block copolymer (A1) is 5% by mass or more with respect to a total amount of the acrylic block copolymer (A).

8. The composition of claim 3, wherein a proportion of the acrylic block copolymer (A1) is 5% by mass or more with respect to a total amount of the acrylic block copolymer (A).

9. The composition of claim 1, wherein the acrylic ester unit of (a1) comprises an alkyl acrylate.

10. The composition of claim 1, wherein the acrylic ester unit of (a1) comprises at least one selected from the group consisting of methyl acrylate, ethyl acrylate, isopropyl acrylate, n-butyl acrylate, 2-ethylhexyl acrylate, dodecyl acrylate, phenoxyethyl acrylate, and 2-methoxyethyl acrylate.

11. The composition of claim 1, wherein the acrylic ester unit of (a1) comprises at least one selected from the group consisting of n-butyl acrylate and 2-ethylhexyl acrylate.

12. The composition of claim 1, wherein the acrylic ester unit of (a2) comprises alkyl methacrylate.

13. The composition of claim 1, wherein the acrylic ester unit of (a2) comprises at least one selected from the group consisting of methyl methacrylate, ethyl methacrylate, isopropyl methacrylate, n-butyl methacrylate, tert-butyl methacrylate, cyclohexyl methacrylate, and isobornyl methacrylate.

14. The composition of claim 1, wherein the acrylic ester unit of (a2) comprises methyl methacrylate.

15. The composition of claim 1, wherein the mass ratio of the acrylic block copolymer (A) to the acrylic resin (B), [(A)/(B)], is in the range of 85/15 to 30/70.

16. The composition of claim 1, wherein the mass ratio of the acrylic block copolymer (A) to the acrylic resin (B), [(A)/(B)], is in the range of 85/15 to 50/50.

* * * * *

UNITED STATES PATENT AND TRADEMARK OFFICE
CERTIFICATE OF CORRECTION

PATENT NO. : 8,268,928 B2
APPLICATION NO. : 13/128548
DATED : September 18, 2012
INVENTOR(S) : Hiroshi Oshima et al.

Page 1 of 1

It is certified that error appears in the above-identified patent and that said Letters Patent is hereby corrected as shown below:

On the title page, Item (73), the Assignee's name is incorrect. Item (73), should read:

--(73) Assignee: Kuraray Co., Ltd., Kurashiki-shi (JP)--

Signed and Sealed this
Twenty-seventh Day of November, 2012

David J. Kappos
*Director of the United States Patent and Trademark Office*